United States Patent
Cornec

(10) Patent No.: US 12,129,763 B2
(45) Date of Patent: Oct. 29, 2024

(54) INNER BLADE SUPPORT RING OF A TURBOMACHINE COMPRESSOR STATOR

(71) Applicant: SAFRAN AIRCRAFT ENGINES, Paris (FR)

(72) Inventor: Nicolas Gérard Bénito Cornec, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 18/274,645

(22) PCT Filed: Feb. 2, 2022

(86) PCT No.: PCT/FR2022/050202
§ 371 (c)(1),
(2) Date: Jul. 27, 2023

(87) PCT Pub. No.: WO2022/167755
PCT Pub. Date: Aug. 11, 2022

(65) Prior Publication Data
US 2024/0093616 A1    Mar. 21, 2024

(30) Foreign Application Priority Data
Feb. 5, 2021   (FR) ....................... 2101113

(51) Int. Cl.
*F04D 29/56* (2006.01)
*F01D 17/16* (2006.01)
(Continued)

(52) U.S. Cl.
CPC .......... *F01D 17/162* (2013.01); *F01D 25/24* (2013.01); *F04D 19/02* (2013.01); *F04D 29/52* (2013.01);
(Continued)

(58) Field of Classification Search
CPC ........ F01D 17/162; F01D 25/24; F04D 19/02; F04D 29/52; F04D 29/54; F04D 29/56; F04D 29/563; F04D 29/64
See application file for complete search history.

(56) References Cited

U.S. PATENT DOCUMENTS

| | | | |
|---|---|---|---|
| 2009/0087304 A1* | 4/2009 | Lejars | F16B 19/02 415/209.3 |
| 2019/0101027 A1* | 4/2019 | Lepretre | F01D 25/243 |
| 2021/0207488 A1* | 7/2021 | Delahaye | F01D 11/001 |

FOREIGN PATENT DOCUMENTS

| | | |
|---|---|---|
| CN | 112 065 777 A | 12/2020 |
| FR | 3 049 003 A1 | 9/2017 |
| JP | 2004-176548 A | 6/2004 |

OTHER PUBLICATIONS

International Search Report for PCT/FR2022/050202 dated Jun. 1, 2022.
French Search Report for FR 2101113 dated Oct. 18, 2021.

* cited by examiner

*Primary Examiner* — Sabbir Hasan
*Assistant Examiner* — Andrew J Marien
(74) *Attorney, Agent, or Firm* — Sughrue Mion, PLLC

(57) ABSTRACT

An inner ring for supporting variable-pitch blades of an axial compressor stator of a turbomachine includes two or more ring sectors, assembled to form the inner ring, each ring sector including plural housings for receiving a pivot axis of one of the blades. At each junction plane between the ends of two successive ring sectors, an assembly pin and a cavity for receiving the assembly pin are engaged. The assembly pin is fixed on one end one of the two successive ring sectors and the cavity is formed at the end of the other of the two successive ring sectors. The cavity receives the assembly pin with a mounting clearance allowing a mounting by sliding (Continued)

fit, and the assembly pin is made of a material having a coefficient of thermal expansion greater than a coefficient of thermal expansion of a material constituting the successive ring sectors.

11 Claims, 3 Drawing Sheets

(51) Int. Cl.
| | |
|---|---|
| *F01D 25/24* | (2006.01) |
| *F04D 19/02* | (2006.01) |
| *F04D 29/52* | (2006.01) |
| *F04D 29/54* | (2006.01) |
| *F04D 29/64* | (2006.01) |

(52) U.S. Cl.
CPC ............ *F04D 29/54* (2013.01); *F04D 29/56* (2013.01); *F04D 29/563* (2013.01); *F04D 29/64* (2013.01); *F05D 2220/323* (2013.01); *F05D 2240/128* (2013.01); *F05D 2260/60* (2013.01)

INNER BLADE SUPPORT RING OF A TURBOMACHINE COMPRESSOR STATOR

CROSS REFERENCE TO RELATED APPLICATIONS

This application is a National Stage of International Application No. PCT/FR2022/050202 filed Feb. 2, 2022, claiming priority based on French Patent Application No. 2101113 filed Feb. 5, 2021, the contents of each of which being herein incorporated by reference in their entireties.

FIELD OF THE INVENTION

The invention lies in the field of axial compressors of a turbomachine, in particular an aircraft turbomachine.

The present invention more specifically relates to an inner ring for supporting the variable-pitch blades of an axial compressor stator of a turbomachine. The invention also relates to the stator provided with such an inner support ring, the axial turbomachine compressor comprising at least one such stator and finally, the turbomachine equipped with such a compressor.

This compressor is preferably a high-pressure compressor.

STATE OF THE ART

The attached FIG. 1 represents one possible exemplary embodiment of an axial turbomachine compressor.

This compressor 1 extends along a longitudinal axis X-X'. It comprises several axial stages 10, disposed in series, each stage comprising a rotor 11 and a bladed stator or stator 12. There is defined at each point of the stator 12:
- an axial direction x, parallel to the longitudinal axis of the compressor X-X',
- a radial direction y, which extends along a radius of the compressor perpendicular to the axial direction x, and
- a circumferential direction z, perpendicular to the axial direction x and to the radial direction y.

Each stator 12 comprises a plurality of blades 13, which extend radially or substantially radially between an outer casing 14 and an inner ring 15. These blades 13 are variable-pitch blades, that is to say they can pivot about their pivot axes to occupy different angles and optimize the flow of gases inside the stator. Each blade 13 thus comprises a radially outer pivot axis 131, housed in the outer casing 14 and a radially inner pivot axis 132, (see attached FIG. 3), housed in the inner ring 15. A servo-control device 16 (for example with a rotating rim and connecting rods) makes it possible to pivot the blades.

The inner ring 15 is made up of several ring sectors 150 (most often two 180° ring sectors as represented in the attached FIG. 2), which are assembled circumferentially end to end (along the direction z) by a cartridge so as to thus form, once they are joined together, a complete 360° ring. The fact of preferentially having two 180° ring sectors is due to an assembly constraint of the compressor composed of two half-shells.

As can be seen in the attached FIG. 3, each ring sector 150 has at its two opposite ends, a contact face 151, preferably a planar contact face. In FIG. 2, it can be seen that when the two ring sectors 150 are assembled end to end, their respective contact faces 151 touch each other and that there is a parting line P between these two sectors, more specifically between their two contact faces 151.

In FIG. 2, the inner ring 15 represented in solid lines corresponds to the normal position of this ring, that is to say its cold position when the compressor is not used.

However, it has been found that the inner rings 15 often exhibit distortions related to their mechanical and/or thermal environment during the operation of the compressor. It was thus possible to observe a deformation of the ring sectors 150, at the level of the parting line P of these sectors, due to the thermal expansion. The expanded position of the sectors 150 is represented in dotted lines in FIG. 2 (direction of the deformation represented by the arrows F).

As can be seen in FIG. 3 and in the attached FIG. 4, each ring sector 150 has a plurality of housings 152 which open out onto its radially outer face 153 and which each make it possible to receive a radially inner pivot axis 132 of a pivoting blade 13. For simplification purposes, a single housing 152 has been schematically represented in FIG. 3.

As better seen in FIG. 4, insofar as a ring sector 150 supports pivoting blades 13, there is an initial operating clearance J1 between the base 133 of each blade 13 and the outer face 153 of the ring sector 150. The distortion and the opening of the ring sectors 150 (deformed position of the ring 150 represented in dotted lines) however leads to a significant reduction of this operating clearance. The reduced clearance between the base 133 of each blade 13 and the radially outer face 153 of the ring sector 150 is referenced J2. This reduced clearance J2 can lead to contacts between the base of the blade 13 and the ring sector 150 and lead to a blocking of the blade 13.

Such a blockage can lead to damaging effects on the compressor, because an incidence deviation of the different blades 13 can lead to a pumping phenomenon of this compressor, that is to say to an aerodynamic stall of the blades 13 leading to an energetic inversion of the air stream inside the compressor 1.

Currently, this problem is resolved by increasing the initial clearance J1 to avoid the contact between the base 133 of the blade 13 and the ring sector 150 despite the deformation of the ring sector related to the thermal expansion. However, this solution is not satisfactory.

DISCLOSURE OF THE INVENTION

The invention aims to propose an inner ring for supporting the variable-pitch blades of an axial compressor stator of a turbomachine, which comprises at least two ring sectors, which are both hot-inseparable during the use of the compressor, (to avoid the aforementioned problem) and capable of being cold-assembled or cold-disassembled, when the compressor is not used, for example for maintenance operations.

To this end, the invention relates to an inner ring for supporting the variable-pitch blades of an axial compressor stator of a turbomachine, comprising at least two ring sectors, assembled circumferentially end to end so as to form said inner ring, each ring sector comprising a plurality of housings for receiving a radially inner pivot axis of one of said blades.

In accordance with the invention, at each junction plane between the ends of two successive ring sectors, the assembly is performed by cooperation of an assembly pin and a cavity for receiving this assembly pin, said assembly pin being fixed on the end of one of said two successive ring sectors and said cavity being formed at the end of the other of said two successive ring sectors, the cavity being configured and dimensioned to receive said assembly pin with a mounting clearance allowing a mounting by sliding fit and said assembly pin is made of a material having a coefficient of thermal expansion greater than that of the material constituting said successive ring sectors so that during the temperature rise resulting from the use of said axial compressor, the assembly pin expands more inside said cavity than the cavity itself, thus ensuring the inseparable assembly of the two successive ring sectors and so that during the temperature decrease resulting from the cessation of the use of said axial compressor, the assembly pin retracts inside said cavity, by allowing the dismounting of said two successive ring sectors.

Thanks to these characteristics of the invention, the assembly of the two ring sectors is therefore reversible.

This technical solution is also simple to implement and inexpensive.

Finally, the invention makes it possible to limit the wear of the blades and to reduce the costs of maintenance and replacement of the parts.

According to other advantageous and non-limiting characteristics of the invention, taken alone or in combination:
- each ring sector has, at one of its two ends, a cavity for receiving an assembly pin and in that an assembly pin is fixed to the other of its two ends;
- at least one of the ring sectors has, at each of its two ends, a receiving cavity and in that at least one other of the ring sectors has, at each of its two ends, an assembly pin;
- the ring comprises two ring sectors assembled end to end to form said inner ring;
- the ratio between the coefficient of thermal expansion of the material constituting the assembly pin and the coefficient of thermal expansion of the material constituting said ring sectors is greater than or equal to 1.3 and less than 2;
- the ratio between the coefficient of thermal expansion of the material constituting the assembly pin and the coefficient of thermal expansion of the material constituting said ring sectors is greater than or equal to 2;
- the material constituting the assembly pin is chosen from aluminum or a nickel-based steel and the material constituting said ring sectors is chosen from steel or titanium;
- said assembly pin is cylindrical and said cavity for receiving this assembly pin is cylindrical in shape.

The invention also relates to an axial turbomachine compressor stator comprising a plurality of variable-pitch blades, pivotally mounted between an outer casing for supporting said blades and an inner ring for supporting said blades, this inner ring being as mentioned above.

The invention also relates to an axial turbomachine compressor comprising at least one stator as mentioned above.

The invention finally relates to a turbomachine equipped with an axial compressor as mentioned above.

DESCRIPTION OF THE FIGURES

Other characteristics, aims and advantages of the invention will emerge from the following description, which is purely illustrative and not limiting, and which should be read in relation to the appended drawings in which.

DETAILED DESCRIPTION OF THE INVENTION

Figure 1:
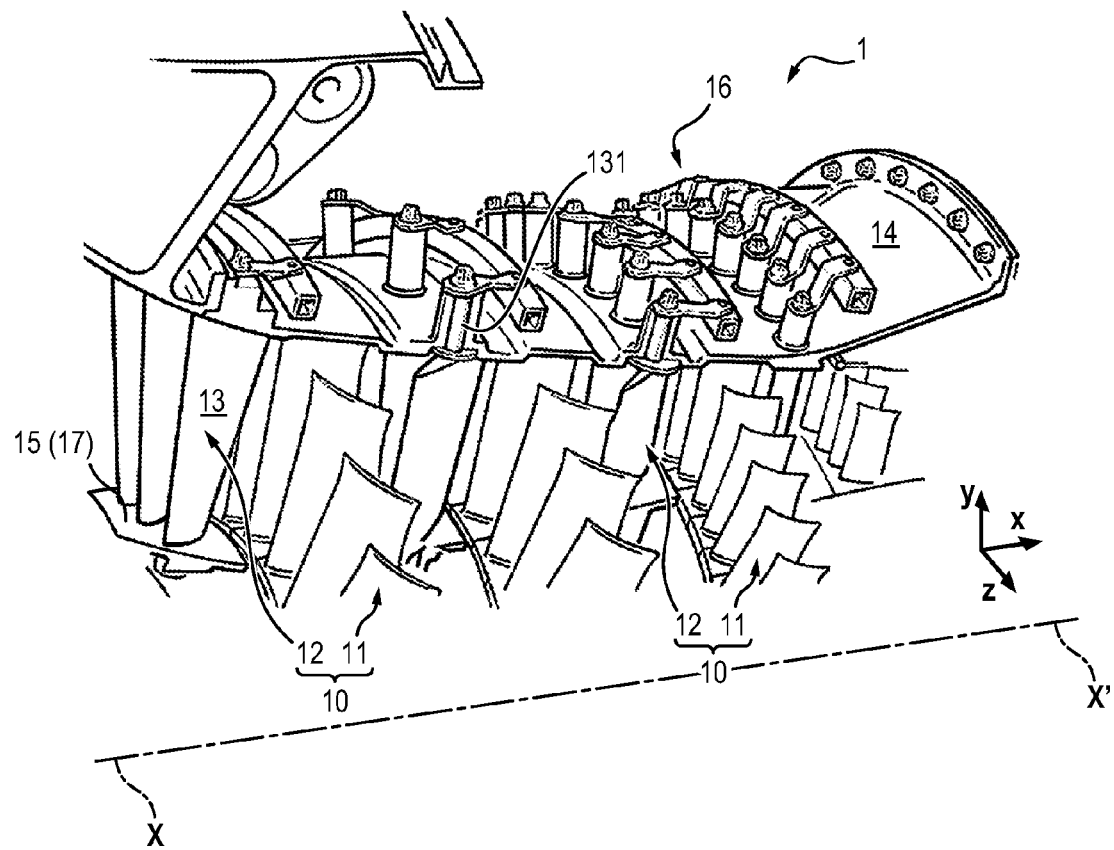
FIG. 1 represents a perspective view of a turbomachine compressor.
Figure 2:
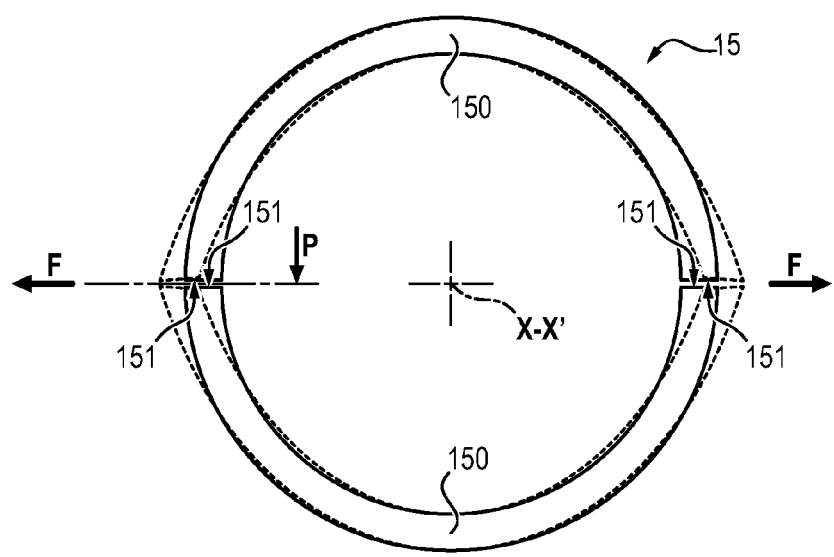
FIG. 2 is a schematic view of an inner ring for supporting the blades of a stator according to the state of the art.
Figure 3:
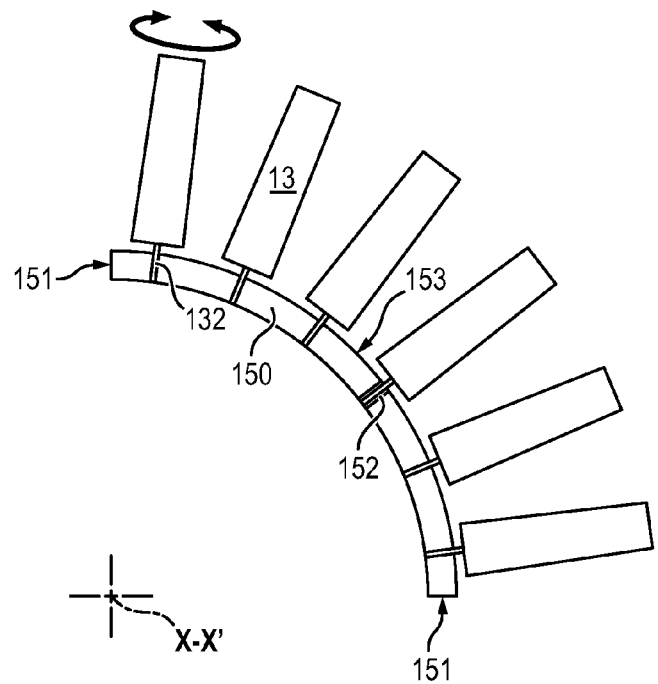
FIG. 3 is a schematic view of a ring sector according to the state of the art.
Figure 4:
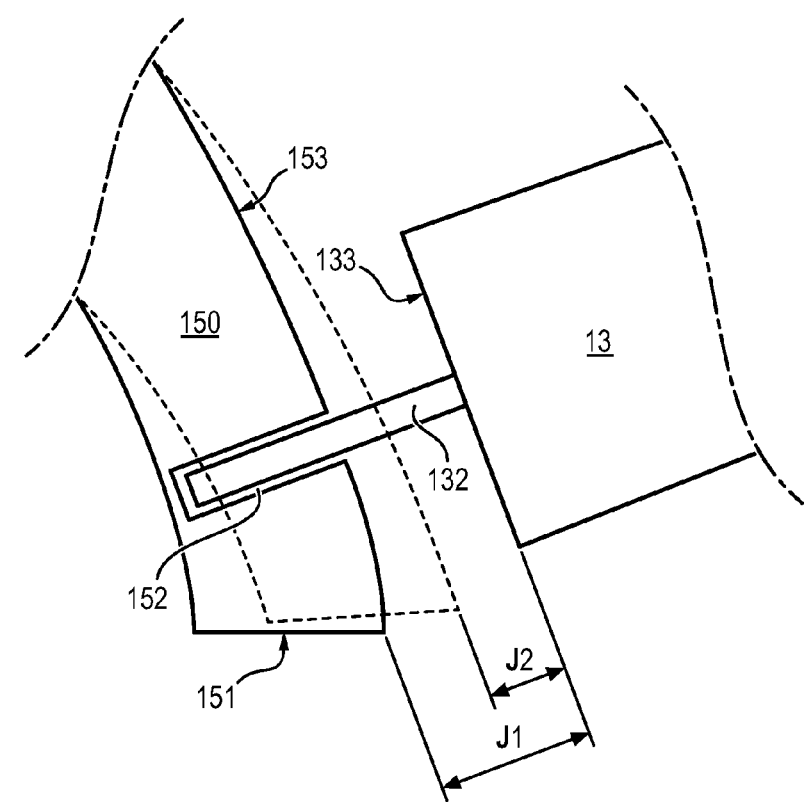
FIG. 4 is a schematic and detail view of the end of a ring sector according to the state of the art.

The inner ring for supporting the variable-pitch blades of an axial compressor stator of a turbomachine, in accordance with the invention, will now be described in relation to FIG. 5. This ring bears the general reference 17.

Just like the previously described inner ring 15, the inner ring 17 comprises at least two ring sectors 170, assembled end to end circumferentially so as to form said complete ring which extends over 360°. Preferably, the inner ring 17 comprises only two ring sectors 170 extending over an angle of 180° each. However, this inner ring 17 could also comprise a greater number of such sectors.

Each ring sector 170 comprises two ends 171, which constitute contact surfaces with the ends 171 of a neighboring ring sector 170. When two successive ring sectors are assembled, there is therefore a junction plane between their ends 171 in contact. The ends 171 are preferably planar.

Furthermore, each ring sector 170 comprises a plurality of housings 172 for receiving the radially inner pivot axis of 132 a pivoting blade 13, as described above. These housings 172 open out onto the radially outer face 173 of each ring sector 170.

At the level of the junction plane (contact plane) between the respective ends 171 of two successive ring sectors, the assembly is carried out by cooperation of an assembly pin 174 with a cavity 175 for receiving this pin.

More specifically, the assembly pin 174 is fixed to the end 171 of one of the two successive ring sectors and the receiving cavity 175 is arranged at the end 171 of the other of said two successive ring sectors.

The pin 174 extends along an axis perpendicular to the plane of the end 171 and the same is true for the cavity 175 which opens out onto this end 171.

Preferably, the assembly pin 174 is cylindrical and the receiving cavity 175 is also a cylindrical bore.

The pin 174 can be fixed on the ring sector 170 by an interference fit i.e. by shrink-fitting. In this case, a recess (not represented in the figures) is formed at the end 171 and the pin 174 is dimensioned to be forcibly inserted therein and to remain fixed therein even on cessation of the use the compressor.

The pin 174 can also be fixed on the ring sector 170 by welding or by bonding, or by screwing.

Figure 5:
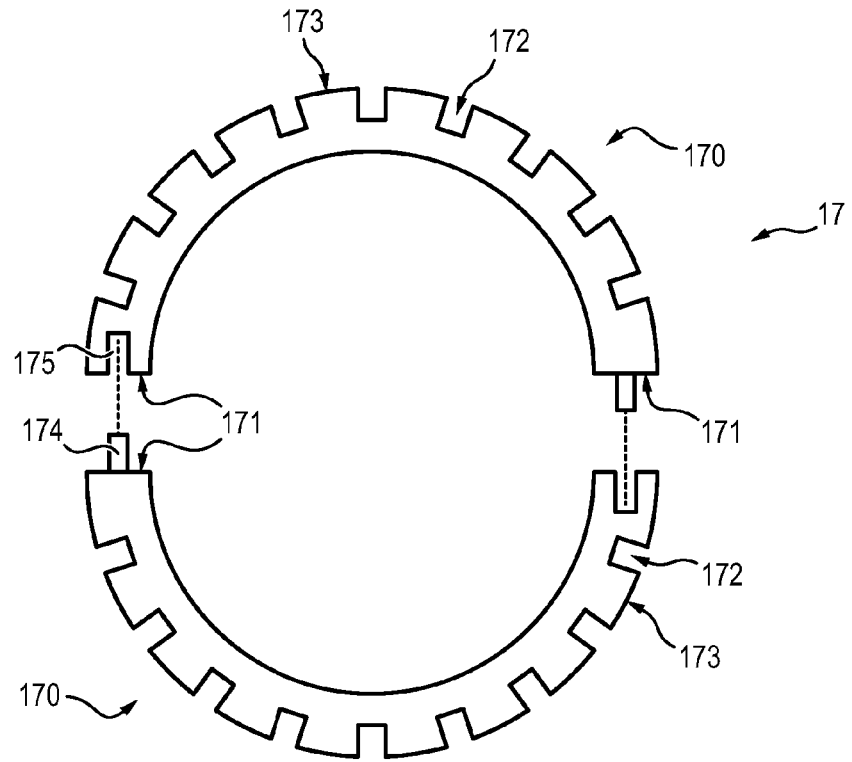
FIG. 5 is a front view of an inner ring for supporting the variable-pitch blades of an axial compressor stator of a turbomachine in accordance with the invention.

Furthermore, according to a first variant, and as represented in FIG. 5, each ring sector 170 has at one of its two ends 171, a cavity 175 and is provided at the other of its two ends 171, with the assembly pin 174.

According to a second variant, not represented in the figures, it is also possible to have at least one ring sector (for example a half-ring) with an assembly pin 174 at each of its two ends 171 and at least one another ring sector (for example another half ring) with a cavity 175 at each of its two ends 171.

Figure 6:
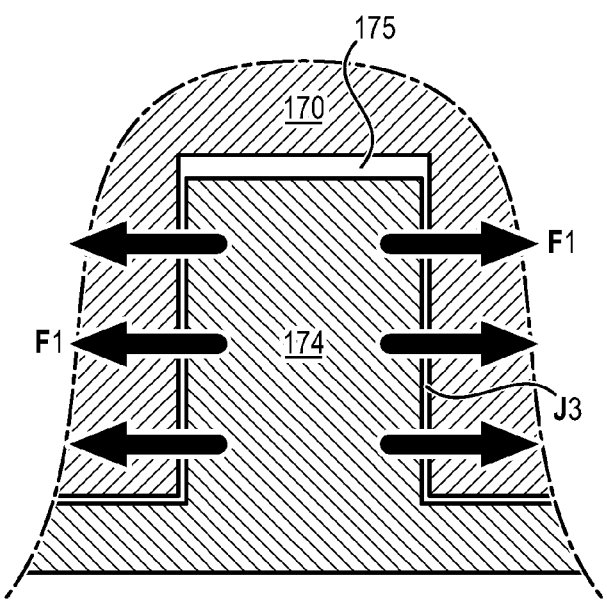
FIG. 6 is a detail view of part of the inner ring in accordance with the invention.

Furthermore, and as best seen in FIG. 6, the cavity 175 is configured and dimensioned with respect to the assembly pin 174 so as to receive the latter with a mounting clearance J3 which allows a mounting by sliding fit. In other words, the pin 174 and the cavity 175 are very finely fitted in order to be able to just slide the pin axially into the cavity 175.

By way of purely indicative example, this mounting clearance J3 between the side walls of the pin 174 and the inner wall of the cavity 175 is very small, of the order of a few hundredths of millimeters. Still by way of example, for a cylindrical pin with a diameter of a few millimeters, preferably a diameter comprised between 3 mm and 8 mm, a fit of the H6g5 type according to the ISO standard can be used.

This mounting clearance J3 is very small but nevertheless allows the cold mounting of the parts.

Finally, the pair of materials making it possible to produce, on the one hand, the pin 174 and, on the other hand, the ring sector 170 having the cavity 175, is chosen so that the coefficient of thermal expansion of the material constituting the pin 174 is greater than the coefficient of thermal expansion of the material constituting the ring sector.

Thus, during the operation of the turbomachine and therefore of the compressor, the latter rises in temperature and the pin 174 expands more than the cavity 175. The pin 174 then exerts a force, due to its swelling, on the walls of the cavity (See arrows F1 in FIG. 6) and the assembly thus forms a shrink-fitting making the two neighboring (successive) ring sectors inseparable. The problematic opening of the ring sectors at the level of the parting line, described previously, is then no longer possible.

Conversely, when the compressor stops, the parts cool down and the pin resumes its original diameter by reverse expansion, which has the effect of eliminating the shrink-fitting with the ring sector. The different ring sectors can then be dismounted, if necessary.

The ring sectors are advantageously made of steel and have an average coefficient of thermal expansion of $12 \cdot 10^{-6}/°$ C. They can also be made of titanium and then have a lower coefficient of thermal expansion, equal to $8.6 \times 10^{-6}/°$ C. In the latter case, a higher dilation ratio is thus obtained with the pin 174.

Steel is preferred in a hot environment, titanium in a cold environment, as explained below.

Preferably, and in order to obtain the aforementioned technical effect, the ratio between the coefficient of thermal expansion of the material constituting the assembly pin and the coefficient of thermal expansion of the material constituting said ring sectors is greater than or equal to 1.3.

For hot environments (temperature above 150° C.), it will preferably be chosen a ratio: coefficient of thermal expansion of the material constituting the assembly pin/coefficient of thermal expansion of the material constituting said ring sectors greater than or equal to 1.3 and less than 2.

Mention may be made, for example, as a material of the pin 174, of a nickel base steel, of the Inconel type which has an average coefficient of expansion of $18 \cdot 10^{-6}/°$ C. or aluminum which has an average coefficient of expansion of $23 \cdot 10^{-6}/°$ C., the aforementioned ratio then being respectively 1.5 and 1.91 with a steel ring sector.

For cold environments (temperature below 150° C.), it will preferably be chosen a ratio: coefficient of thermal expansion of the material constituting the assembly pin/coefficient of thermal expansion of the material constituting said ring sectors greater than or equal to 2.

Mention may be made, for example, as a material of the pin 174, of aluminum which has an average coefficient of expansion of $23 \cdot 10^{-6}/°$ C., the aforementioned ratio then being 2.67 with a titanium ring sector.

In the case of a high-pressure compressor, the first stages of stators will be in a cold environment while the last stages will be in a hot environment, the temperature of the compressor increasing from compression stage to compression stage.

By combining the sliding assembly clearance with the aforementioned coefficients of expansion ratios, the clamping by expanding the pin in the cavity is thus obtained, and this from low temperatures around 100° C.

The invention also relates to a stator such as the aforementioned stator 12 comprising the blades 13 and the outer casing 14, as described previously but with the ring 17 in accordance with the invention which replaces the inner ring 15, as it appears better in FIG. 1 (reference 17 in parentheses).

Similarly, the invention relates to the compressor 1 comprising at least one stage 10, each stage comprising a rotor 11 and a stator 12 comprising the inner ring 17 and finally a turbomachine comprising this compressor 1 with the ring 17.

The invention claimed is:

1. An inner ring comprising at least two ring sectors, assembled circumferentially end to end so as to form the inner ring, each of the at least two ring sectors comprising a plurality of housings for receiving a radially inner pivot axis of one of a plurality of variable-pitch blades,
    wherein each of the at least two ring sectors has two ends,
    wherein there is a junction plane between the two ends of the at least two ring sectors that form an assembly,
    wherein at each junction plane between the two ends of the at least two ring sectors that that from the assembly of two successive ring sectors, the assembly of the two successive ring sectors is performed by cooperation of an assembly pin and a cavity for receiving the assembly pin, the assembly pin being fixed on one of the two ends of one of the two successive ring sectors and the cavity being formed at one of the two ends of the other of the two successive ring sectors,
    wherein the cavity is configured and dimensioned to receive the assembly pin with a mounting clearance allowing a mounting by sliding fit,
    and wherein the assembly pin is made of a material having a coefficient of thermal expansion greater than a coefficient of thermal expansion of a material constituting the two successive ring sectors so that during a temperature rise, the assembly pin expands more inside the cavity than the cavity itself, thus ensuring the inseparable assembly of the two successive ring sectors and so that during a temperature decrease, the assembly pin retracts inside the cavity, by allowing a dismounting of the two successive ring sectors.

2. The inner ring according to claim 1, wherein each of the at least two ring sectors has the cavity for receiving the assembly pin at a first end of the two ends of the ring sector and has the assembly pin at a second end of the two ends of the ring sector.

3. The inner ring according to claim 1, wherein at least one of the at least two ring sectors has, at each of its two ends, the cavity for receiving the assembly pin and wherein at least one other of the at least two ring sectors has, at each of its two ends, the assembly pin.

4. The inner ring according to claim 1, wherein the inner ring comprises two of the at least two ring sectors assembled end to end to form said inner ring.

5. The inner ring (according to claim 1, wherein a ratio between the coefficient of thermal expansion of the material constituting the assembly pin and the coefficient of thermal expansion of the material constituting the at least two ring sectors is greater than or equal to 1.3 and less than 2.

6. The inner ring according to claim 1, wherein a ratio between the coefficient of thermal expansion of the material constituting the assembly pin and the coefficient of thermal expansion of the material constituting the at least two ring sectors (is greater than or equal to 2.

7. The inner ring according to claim 1, wherein the material constituting the assembly pin is chosen from aluminum or a nickel-based steel and wherein the material constituting the at least two ring sectors is chosen from steel or titanium.

8. The inner ring according to claim 1, wherein the assembly pin is cylindrical wherein the cavity for receiving this assembly pin is cylindrical in shape.

9. An axial turbomachine compressor stator comprising:
   the inner ring according to claim 1; and
   the plurality of variable-pitch blades, pivotally mounted between an outer casing for supporting the variable-pitch blades and the inner ring for supporting the variable-pitch blades.

10. An axial turbomachine compressor, comprising at least one of the axial turbomachine compressor stator according to claim 9.

11. A turbomachine comprising at least one of the axial turbomachine compressor according to claim 10.

* * * * *